United States Patent
Yu et al.

(10) Patent No.: US 9,321,648 B2
(45) Date of Patent: Apr. 26, 2016

(54) PREPARATION METHOD OF BATTERY COMPOSITE MATERIAL AND PRECURSOR THEREOF

(75) Inventors: Pei-Jung Yu, Taoyuan County (TW); Han-Wei Hsieh, Taoyuan County (TW)

(73) Assignee: ADVANCED LITHIUM ELECTROCHEMISTRY CO., LTD., Taoyuan (TW)

( * ) Notice: Subject to any disclaimer, the term of this patent is extended or adjusted under 35 U.S.C. 154(b) by 169 days.

(21) Appl. No.: 14/232,726

(22) PCT Filed: Jul. 20, 2012

(86) PCT No.: PCT/CN2012/078973
§ 371 (c)(1),
(2), (4) Date: Sep. 25, 2014

(87) PCT Pub. No.: WO2013/010505
PCT Pub. Date: Jan. 24, 2013

(65) Prior Publication Data
US 2015/0030517 A1     Jan. 29, 2015

Related U.S. Application Data

(60) Provisional application No. 61/509,636, filed on Jul. 20, 2011.

(51) Int. Cl.
*H01M 4/88* (2006.01)
*C01B 25/45* (2006.01)
(Continued)

(52) U.S. Cl.
CPC ............... *C01B 25/45* (2013.01); *C01B 25/375* (2013.01); *H01M 4/04* (2013.01); *H01M 4/5825* (2013.01);
(Continued)

(58) Field of Classification Search
CPC ...... C01B 25/45; H01M 4/139; H01M 4/364; H01M 4/5825
USPC ................. 252/182.1; 423/306, 311; 429/221
See application file for complete search history.

(56) References Cited

U.S. PATENT DOCUMENTS

2006/0263286 A1   11/2006   Wu et al.
2008/0008938 A1    1/2008   Wu et al.

FOREIGN PATENT DOCUMENTS

CN          1706057     12/2005
CN        101693532      4/2010
(Continued)

OTHER PUBLICATIONS

Shang, Y. et al. "Synthesizing lithium iron phosphate in solution comprises mixing and stirring phosphoric acid with ferric oxide, adding compound of lithium and water-soluble organic substance, precipitating, cooling, filtering, heating, and calcining." Database WPI, Section Ch, Week 201030, Thomson Scientific, London, GB, XP002735132 and CN101696001A (CUYQI) Univ. Qinghua, Apr. 21, 2010.

*Primary Examiner* — Khanh Tuan Nguyen
(74) *Attorney, Agent, or Firm* — Kirton McConkie; Evan R. Witt

(57) ABSTRACT

A preparation method of a battery composite material includes steps of providing phosphoric acid, iron powder, a carbon source and a first reactant, processing a reaction of the phosphoric acid and the iron powder to produce a first product, calcining the first product to produce a precursor, among which the formula of the precursor is written by $Fe_7(PO_4)_6$, and processing a reaction of the precursor, the carbon source and the first reactant to get a reaction mixture and calcining the reaction mixture to produce the battery composite material. As a result, the present invention achieves the advantages of reducing grind time of fabricating processes, so that the prime cost, the time cost, and the difficulty of fabricating are reduced.

18 Claims, 7 Drawing Sheets

(51) Int. Cl.
*H01M 4/04* (2006.01)
*H01M 4/58* (2010.01)
*C01B 25/37* (2006.01)
*H01M 10/052* (2010.01)

(52) U.S. Cl.
CPC ......... *C01P 2004/62* (2013.01); *C01P 2006/40* (2013.01); *H01M 10/052* (2013.01); *Y02E 60/122* (2013.01)

(56) References Cited

FOREIGN PATENT DOCUMENTS

| | | |
|---|---|---|
| CN | 101696001 | 4/2010 |
| CN | 101830452 | 9/2010 |
| CN | 101955175 | 1/2011 |
| JP | 2004-509058 | 3/2004 |
| JP | 2007-305585 | 11/2007 |
| JP | 2011-042553 | 3/2011 |
| JP | 2011132095 | 7/2011 |

PREPARATION METHOD OF BATTERY COMPOSITE MATERIAL AND PRECURSOR THEREOF

TECHNICAL FIELD

The present disclosure relates to a preparation method, and more particularly to a preparation method of battery composite material and a precursor thereof.

BACKGROUND

Due to the sustained global energy shortage, the price of oil becomes higher and the environmental consciousness rises day by days. The most popular subject of the energy industry is how to provide a clean and effective energy. In a variety of alternative energies, the chemical battery is the most actively developing technology. With continued investment in research and development of related industries, the chemical battery technology is not only continuously improved and enhanced, but also widely used in our daily life, such as consuming electronics, medical equipment, electric bicycles, electric motorcycles, electric cars and electric buses.

Particularly, the Lithium Ferric Phosphate ($LiFePO_4$, hereinafter referred as "LFP") composite batteries are widely accepted by the market because of the large current and long life cycle. Also, the LFP composite batteries have no risk of explosion and have the advantages of high power efficiency and low pollution so as to be used in replace of the conventional lead-acid, nickel-metal hydride and nickel-cadmium batteries. After years of research, the Lithium Ferric Phosphate Nano-Co-crystalline Olivine (hereinafter referred as "LFP-NCO") battery is developed. The LFP-NCO battery is a single compound consisting Li, Fe, P and metals or precursor of metal composition, and is a non-coated and non-doped material, so that the LFP-NCO battery can significantly improve the power conductivity and eliminate impurities. Moreover, the price of the LFP-NCO battery is lower than conventional lithium ferric phosphate materials, in which the LFP-NCO battery has higher market competitiveness and becomes the main product of the industry.

In general, ferric phosphate ($FePO_4$), lithium hydroxide (LiOH) and lithium carbonate ($Li_2CO_3$) are applied to process a reaction of the conventional preparation method of LFP-NCO. Due to the high cost of raw materials of lithium hydroxide, the high requirement of much more ferric phosphate, and much more grinding times, the costs per unit of time and money are increased. Moreover, the preparation method includes acid-base neutralization reactions, so the process is quite sensitive to the pH value, which causes the viscosity of materials and the blockage of processing pipes. Also, the processing temperature cannot be stably controlled because of the endothermic and exothermic phenomena of the neutralization reactions, such that the operation difficulty is increased over and over again. In addition, in the process of the aforementioned preparation method, the materials have to be moved for several times, which causes risk of pollutions, thereby decreasing the product quality.

There is a need of providing a preparation method of battery composite material and a precursor thereof to obviate the drawbacks encountered from the prior art.

BRIEF SUMMARY

It is an object of the present invention to provide a preparation method of a battery composite material and a precursor thereof in order to eliminate the drawbacks of the high material cost and time cost of preparing the conventional battery, the high sensitivity of pH value of the process caused by neutralization reactions, the blockage of processing pipes, the unstable temperature and the pollutions during movements of materials.

An object of the present invention provides a preparation method of a battery composite material and a precursor thereof for reducing the grinding time and the costs per unit of time and money in manner of preparing the battery composite material through the precursor produced via reactions. Meanwhile, the sensitivity of pH value of the process is reduced, the viscosity of the material and the blockage of processing pipes are avoided, the processing temperature is stably controlled, and the operation difficulty of the process is reduced.

Another object of present invention provides a preparation method of a battery composite material and a precursor thereof in order to reduce the waste of materials and totally enhance the product qualities by the fully reacted phosphoric acid and iron powder of the two-times reactions of the phosphoric acid, the deionized water and the iron powder.

In accordance with an aspect of the present disclosure, there is provided a preparation method of a battery composite material. The preparation method includes steps of providing phosphoric acid, iron powder, a carbon source and a first reactant, processing a reaction of the phosphoric acid and the iron powder to produce a first product, calcining the first product to produce a precursor, among which the formula of the precursor is written by $Fe_7(PO_4)_6$, and processing a reaction of the precursor, the carbon source and the first reactant to get a reaction mixture and calcining the reaction mixture to produce the battery composite material.

In accordance with another aspect of the present disclosure, there is provided a preparation method of a battery composite material. The preparation method includes steps of providing phosphoric acid, iron powder, a carbon source and a first reactant, among which the formula of the phosphoric acid is written by $H_3PO_4$, and the formula of the iron powder is written by Fe, allowing deionized water to dissolve a first quantity of the phosphoric acid for forming a first phosphoric acid solution, processing a reaction of the first phosphoric acid solution and the iron powder, adding a second phosphoric acid solution consisting a second quantity of the phosphoric acid and processing a reaction of the first phosphoric acid solution, the second phosphoric acid solution and the iron powder in order to produce a precursor solution, among which the weight ratio of the first quantity to the second quantity is 3:1, performing a spray drying action and a thermal treatment to the precursor solution in order to obtain a precursor, among which the formula of the precursor is written by $Fe_7(PO_4)_6$, and processing a reaction of the precursor and the first reactant to produce the battery composite material.

In accordance with another aspect of the present disclosure, there is provided a preparation method of a precursor of a battery composite material. The preparation method includes steps of processing a reaction of iron powder and a compound releasing phosphate ions in a solution to produce a first product, among which a carbon source (e.g. a carbohydrate, an organic compound, a polymer or a macromolecule material) can be added in this step, and performing a thermal treatment to the first product for producing a precursor, among which the formula of the precursor is written by $Fe_7(PO_4)_6$.

In accordance with still another aspect of the present disclosure, there is provided a preparation method of a battery composite material. The preparation method includes steps of processing a reaction of a precursor and a first reactant and calcining the reaction mixture to produce the battery composite material, among which the formula of the precursor is written by $Fe_7(PO_4)_6$, the formula of the battery composite material is written by $LiFePO_4$, and the first reactant is not limited to be a compound consisting of lithium such as LiOH or $Li_2CO_3$, or a mixture of several compounds consisting of lithium.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
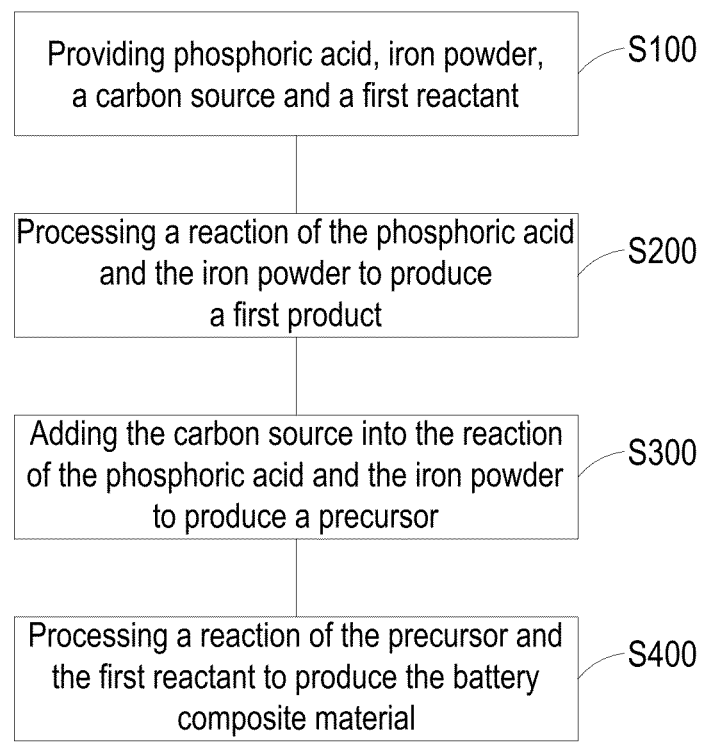
FIG. 1 schematically illustrates the flow chart of a preparation method of a battery composite material according to an embodiment of the present invention.

Please refer to FIG. 1. FIG. 1 schematically illustrates the flow chart of a preparation method of a battery composite material according to an embodiment of the present invention. A preparation method of a batter composite material of the present invention includes steps as follows. At first, providing phosphoric acid, iron powder, a carbon source and a first reactant as shown in step S100, among which the carbon source is not limited to a carbohydrate, an organic compound, a polymer or a macromolecule material, the formula of the phosphoric acid is written by $H_3PO_4$, and the formula of the iron powder is written by Fe. In some embodiments, the carbohydrate is not limited to fructose, sucrose, lactose or galactose. The macromolecule material is not limited to polyvinylpyrrolidone, and the formula of the macromolecule material is written by $(C_6H_9NO)_n$, among which n is a natural number, and the IUPAC name of the macromolecule material is PVP. The first reactant is lithium hydroxide (LiOH), lithium carbonate ($Li_2CO_3$), a compound consisting of lithium, or a mixture of several compounds consisting of lithium, but not limited thereto.

Next, processing a reaction of the phosphoric acid and the iron powder to produce a first product as shown in step S200. In this embodiment, the first product is an amorphous body of ferric phosphate, and the formula of the first product is written by $a\text{-}FePO_4 \cdot xH_2O$, among which a>0 and x>0.

Then, adding the carbon source into the reaction of the phosphoric acid and the iron powder, grinding and calcining the first product to produce a precursor as shown in step S300, among which the formula of the precursor is written by $Fe_7(PO_4)_6$.

Finally, processing a reaction of the precursor and the first reactant to produce the battery composite material as shown in step S400, among which the battery composite material is for example $LiFePO_4$. In the step S400, metal oxide, such as $V_2O_5$ or MgO, can be added into the reaction, so that a $LiFePO_4$-like material consisting of the metal oxide is produced, which can be called or named "lithium ferric phosphate nano-co-crystalline olivine (LFP-NCO)".

Under this circumstance, the present invention provides a preparation method of a battery composite material for reducing the material cost in manner of preparing the battery composite material through the precursor produced via reactions and compounds consisting of lithium atom, which is not limited to LiOH. Meanwhile, the sensitivity of pH value of the process is reduced, the viscosity of the material and the blockage of processing pipes are avoided, the processing temperature is stably controlled, and the operation difficulty of the process is reduced.

Figure 2:
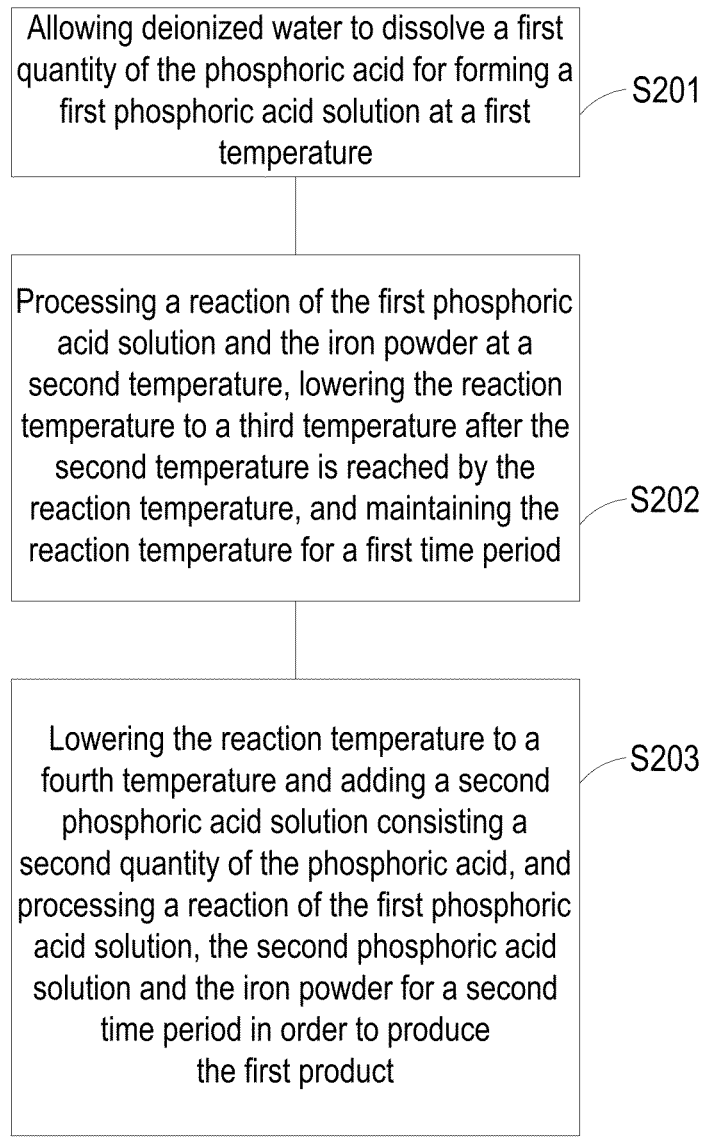
FIG. 2 schematically illustrates a detailed flow chart of the preparation method of a battery composite material according to an embodiment of the present invention.

Please refer to FIG. 1 and FIG. 2. FIG. 2 schematically illustrates a detailed flow chart of the preparation method of a battery composite material according to an embodiment of the present invention. As shown in FIG. 1 and FIG. 2, the detailed flow chart of the step S200 of the preparation method of the battery composite material of the present invention includes steps as follows. As shown in step S201, allowing deionized water to dissolve a first quantity of the phosphoric acid for forming a first phosphoric acid solution at a first temperature, among which the first temperature can be preheated to a temperature equal to or larger than 40° C. and equal to or less than 50° C., and is preferred to be preheated to 42° C., but not limited thereto. Next, as shown in step S202, processing a reaction of the first phosphoric acid solution and the iron powder at a second temperature, lowering the reaction temperature to a third temperature after the second temperature is reached by the reaction temperature, and maintaining the reaction temperature at the third temperature for a first time period. In some embodiments, the first phosphoric acid may be replaced by a compound releasing phosphate ions in a solution so as to be reacted with the iron powder in order to produce the first product, but not limited thereto. The second temperature is equal to or less than 60° C., and is preferably 60° C., and the third temperature is equal to or less than 50° C., and is preferably 50° C. The first time period is at least 3 hours, and is preferably 3 hours.

In other words, the preferably embodiment of the step S202 is not limited to be implemented as processing a reaction of the first phosphoric acid solution and the iron powder at 60° C., lowering the reaction temperature to 50° C. after the reaction temperature reached 60° C., and maintaining the reaction temperature at 50° C. for 3 hours. Then, as shown in step S203, lowering the reaction temperature to a fourth temperature and adding a second phosphoric acid solution consisting a second quantity of the phosphoric acid, and processing a reaction of the first phosphoric acid solution, the second phosphoric acid solution and the iron powder for a second time period in order to produce the first product.

In this embodiment, the first product is an amorphous body of ferric phosphate, and the formula of the first product is written by a-$FePO_4 \cdot xH_2O$ (a>0, x>0). The fourth temperature is equal to or less than 30° C., and is preferably 30° C. The second time period is at least 23 hours, and is preferably 23 hours. The weight ratio of the first quantity to the second quantity is 3:1, i.e. the first quantity is 75% and the second quantity is 25%. Via the fully reacted phosphoric acid and iron powder of the two-times reactions of the phosphoric acid, the deionized water and the iron powder, the waste of materials is reduced, and the product qualities are totally enhanced.

Figure 3:
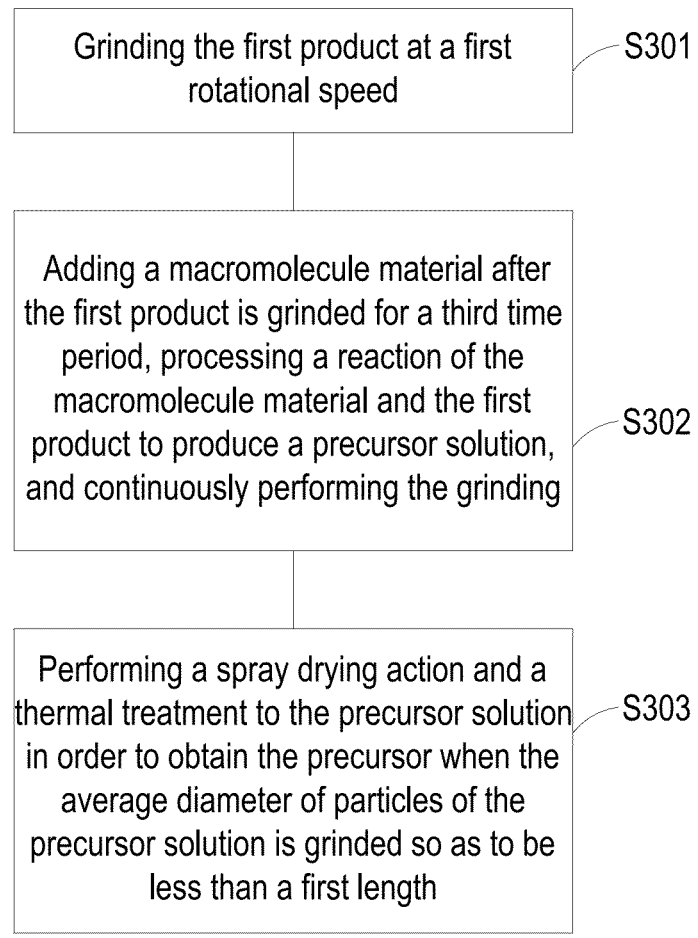
FIG. 3 schematically illustrates another detailed flow chart of the preparation method of a battery composite material according to an embodiment of the present invention.

After 26 hours of the above-mentioned reaction, the step S300 of the preparation method of the battery composite material of the present invention is performed. Please refer to FIG. 3. FIG. 3 schematically illustrates another detailed flow chart of the preparation method of a battery composite material according to an embodiment of the present invention. At first, as shown in step S301 illustrated in FIG. 3, grinding the first product at a first rotational speed, among which the first rotational speed is equal to or greater than 450 rpm and equal to or less than 650 rpm, and is preferably 550 rpm.

Next, as shown in step S302, adding the carbon source, such as the macromolecule material PVP, after the first product is grinded for a third time period, which is preferably at least 5 minutes, processing a reaction of the macromolecule material and the first product to produce a precursor solution, and continuously performing the grinding till the step S303. The step S303 is shown as performing a spray drying action and a thermal treatment to the precursor solution in order to obtain the precursor when the average diameter of particles (i.e. particle size distribution D50) of the precursor solution is grinded so as to be less than a first length, among which the first length is for example but not limited to 1 micrometer. The formula of the precursor is written by $Fe_7(PO_4)_6$.

In this embodiment, the spray drying action is implemented by a rotary spray dryer. An entrance temperature of the spray drying action or the rotary spray dryer is 210° C., an exit temperature of the spray drying action or the rotary spray dryer is −95° C., and the rotational speed of the spray drying action or the rotary spray dryer is 350 Hz, but not limited thereto. On the other hand, the thermal treatment is sequentially performed at 280° C. for 2 hours and at 350° C. for 1 hour in helium atmosphere.

Figure 4:
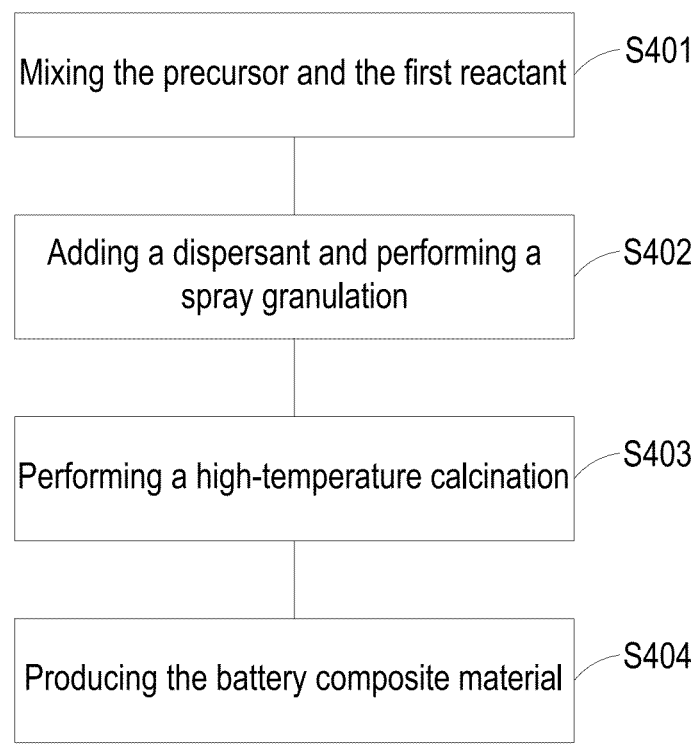
FIG. 4 schematically illustrates still another detailed flow chart of the preparation method of a battery composite material according to an embodiment of the present invention.

The precursor of the preparation method of the battery composite material of the present invention is completely prepared. The detailed flow char of the step S400 is described as follows. Please refer to FIG. 4. FIG. 4 schematically illustrates still another detailed flow chart of the preparation method of a battery composite material according to an embodiment of the present invention. As shown in FIG. 4, the detailed flow chart of the step S400 includes steps of mixing the precursor (i.e. $Fe_7(PO_4)_6$) and the first reactant, which is not limited to be a compound consisting of lithium such as LiOH or $Li_2CO_3$, or a mixture of several compounds consisting of lithium, as shown in step S401, adding a dispersant and performing a spray granulation as shown in step S402, performing a high-temperature calcination as shown in step S403, and producing the battery composite material, which is for example lithium ferric phosphate (i.e. $LiFePO_4$), as shown in step S404.

The following embodiment is presented herein for purpose of illustration and description of the preparation method of the battery composite material of the present disclosure.

Embodiment

Figure 5:
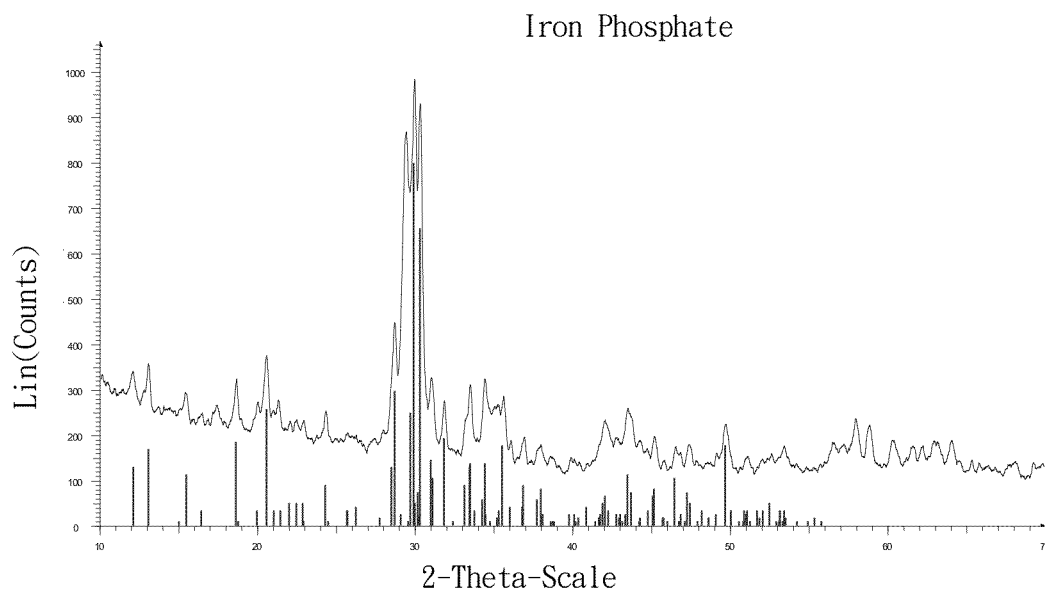
FIG. 5 schematically illustrates the X-ray diffraction analysis diagram of a precursor prepared by the preparation method of the battery composite material of the present invention.
Figure 6:
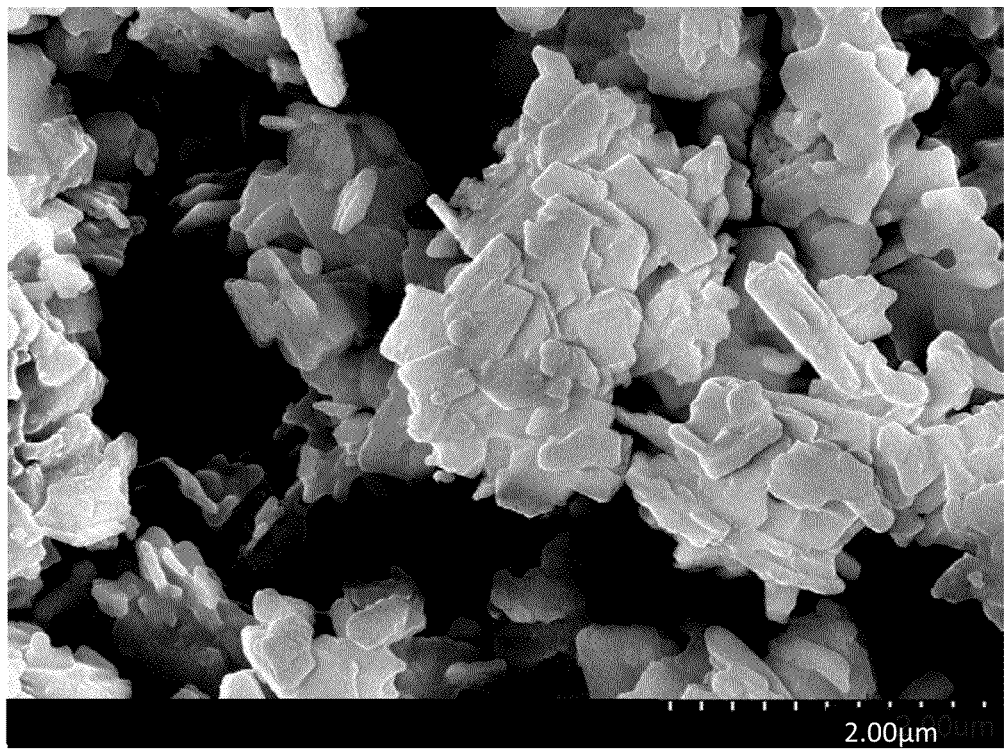
FIG. 6 schematically illustrates the SEM analysis diagram of the precursor prepared by the preparation method of the battery composite material of the present invention.

At first, providing 5169 grams of phosphoric acid (Purity>85%), 12.2 liters of deionized water and 2948 grams of iron powder (Purity>99%) and processing two-times reactions and stirring for 26 hours. Next, adding a dispersant and using a horizontal sander to grind the mixture (450-650 rpm) for 1 hour, among which a carbon source (e.g. a carbohydrate, an organic compound, a polymer or a macromolecule material such as PVP) can be added in this step, to obtain a $Fe_7(PO_4)_6$ precursor solution. Then, performing a spray drying action to the precursor solution, putting the product into a ceramic sagger, and performing a calcination to the product, among which the calcination is sequentially performed at 280° C. for 2 hours and at 350° C. for 1 hour in helium atmosphere. The calcined compound is analyzed in manner of X-ray diffraction, and the analysis diagram is shown as FIG. 5. After comparing the diagram with JCPDS card, the compound is confirmed to be $Fe_7(PO_4)_6$. The surface exterior is analyzed through SEM, and the SEM analysis diagram is shown as FIG. 6.

Figure 7:
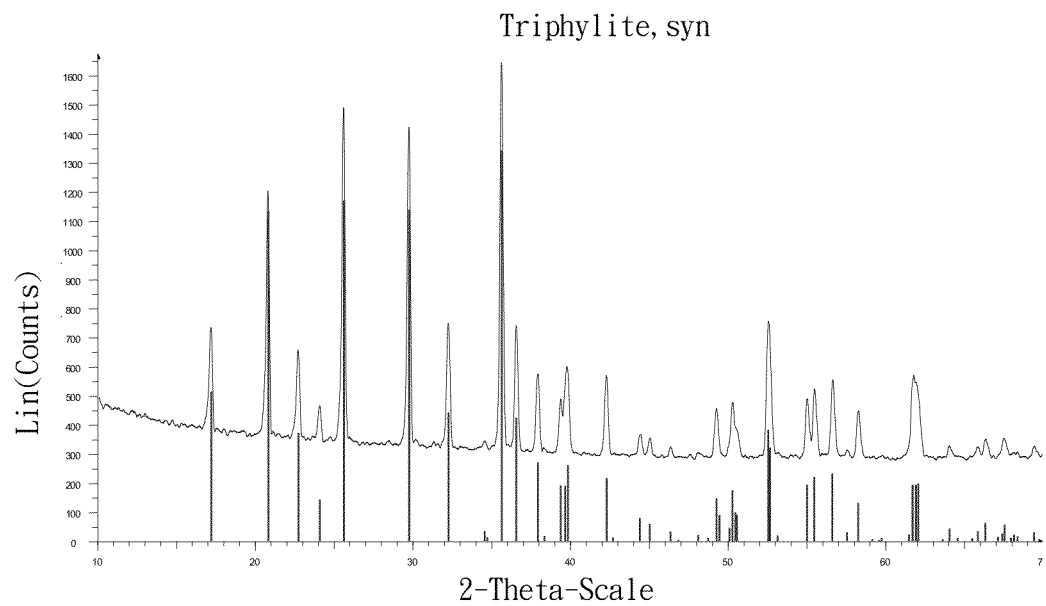
FIG. 7 schematically illustrates the X-ray diffraction analysis diagram of the battery composite material prepared by the preparation method of the battery composite material of the present invention.
Figure 8:
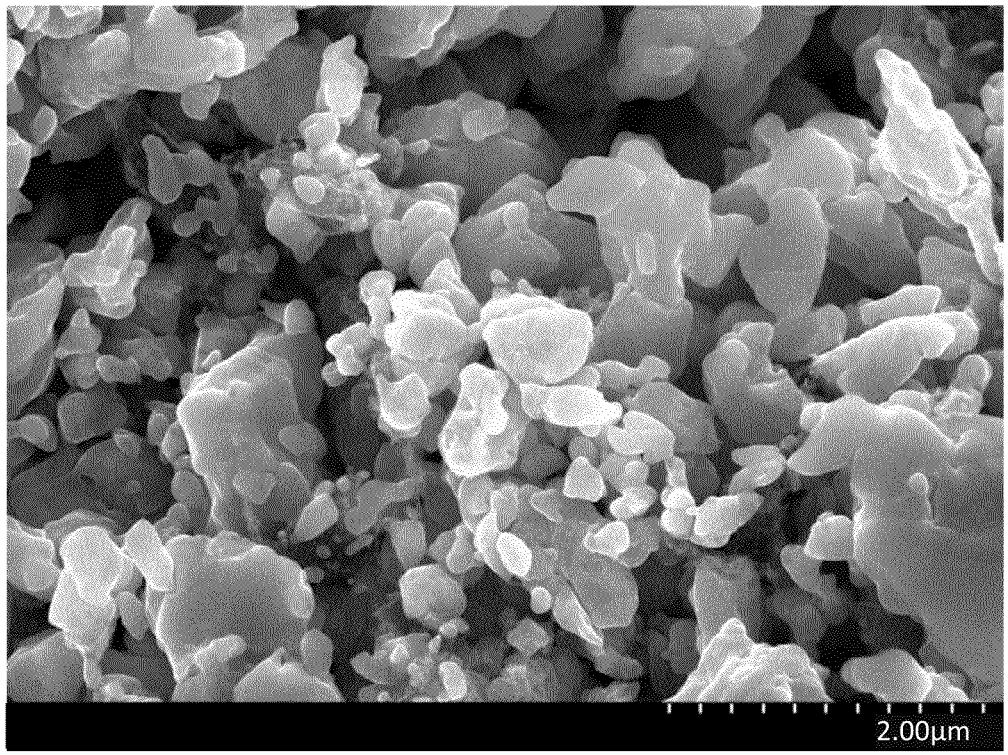
FIG. 8 schematically illustrates the SEM analysis diagram of the battery composite material prepared by the preparation method of the battery composite material of the present invention.

Next, adding 4804 grams of $Fe_7(PO_4)_6$ obtained in the above-mentioned steps, 392 grams of phosphoric acid, 189 grams of lithium carbonate, 3.5 grams of vanadium pentoxide, 62.5 grams of fructose and 0.06 grams of TritonX-100® into pure water for grinding of the horizontal sander. After grinding, the $LiFePO_4$ precursor solution is obtained. Then, performing a spray drying action to this precursor solution, putting the product into a ceramic sagger, and performing a calcination to the product, among which the calcination is performed at 550° C. to 750° C. for 8 to 12 hours in nitrogen atmosphere. The calcined compound is analyzed in manner of X-ray diffraction, and the analysis diagram is shown as FIG. 7. After comparing the diagram with JCPDS card, the compound is confirmed to be $LiFePO_4$. The surface exterior is analyzed through SEM, and the SEM analysis diagram is shown as FIG. 8.

Figure 9:
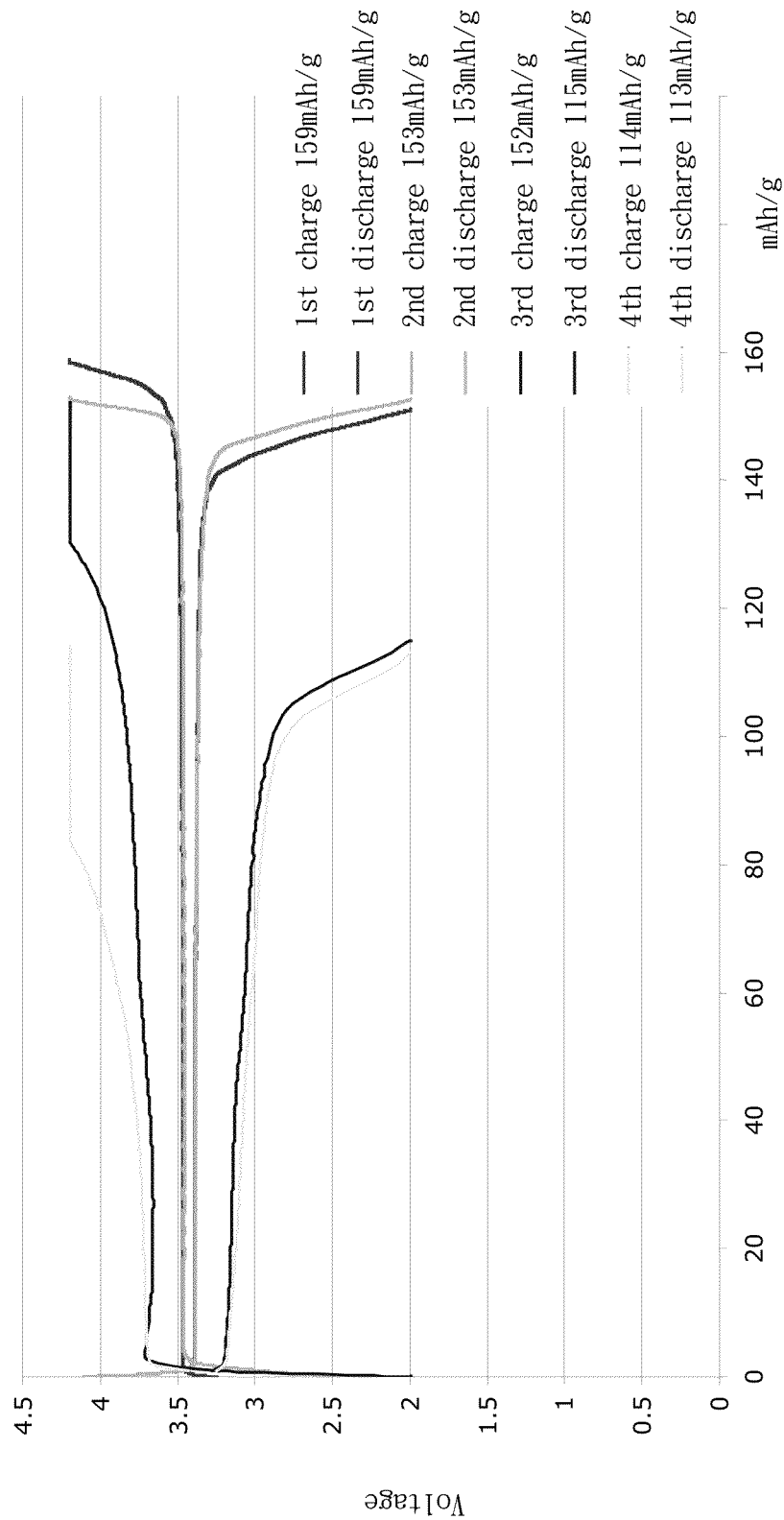
FIG. 9 schematically illustrates a charging and discharging characteristic diagram of a cell battery made of the battery composite material prepared by the preparation method of the battery composite material of the present invention.

A coin-cell battery is made of the $LiFePO_4$ obtained in this embodiment. The electric characteristics of charging and discharging are tested and analyzed through a charging and discharging machine. The test and the analysis are performed at 0.1 coulombs for two cycles and 2 coulombs for two cycles. The charging and discharging characteristic diagram is shown as FIG. 9. The cutoff voltage of the coin-cell battery is 2 to 4.2 volts.

From the above description, the present invention provides a preparation method of a battery composite material and a precursor thereof for reducing the grinding time and the costs per unit of time and money in manner of preparing the battery composite material through the precursor produced via reactions. Meanwhile, the sensitivity of pH value of the process is reduced, the viscosity of the material and the blockage of processing pipes are avoided, the processing temperature is stably controlled, and the operation difficulty of the process is reduced. Additionally, the present disclosure also provides a preparation method of a battery composite material and a precursor thereof in order to reduce the waste of materials and totally enhance the product qualities by the fully reacted phosphoric acid and iron powder of the two-times reactions of the phosphoric acid, the deionized water and the iron powder.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A preparation method of a battery composite material, comprising steps of:
    (a) providing phosphoric acid, iron powder, a carbon source and a first reactant;
    (b) processing a reaction of said phosphoric acid and said iron powder to produce a first product;
    (c) calcining said first product to produce a precursor, wherein the formula of said precursor is written by $Fe_7(PO_4)_6$; and
    (d) processing a reaction of said precursor, said carbon source and said first reactant to obtain a reaction mixture, and then calcining said reaction mixture to produce said battery composite material.

2. The preparation method according to claim 1, wherein said first product is an amorphous body of ferric phosphate, and the formula of said first product is written by $a\text{-}FePO_4 \cdot xH_2O$, and wherein a>0 and x>0.

3. The preparation method according to claim 1, wherein said carbon source is a carbohydrate, an organic compound, a polymer or a macromolecule material, and wherein said macromolecule material is polyvinylpyrrolidone, and the formula of said macromolecule material is written by $(C_6H_9NO)_n$, wherein n is a natural number, and the IUPAC name of said macromolecule material is PVP.

4. The preparation method according to claim 1, wherein said first reactant is a lithium carbonate, and the formula of said first reactant is written by $Li_2CO_3$, and wherein said battery composite material is a lithium ferric phosphate nano-co-crystalline olivine (LFP-NCO).

5. The preparation method according to claim 1, wherein said step (b) further comprises steps of:
    (b1) allowing deionized water to dissolve a first quantity of said phosphoric acid for forming a first phosphoric acid solution at a first temperature;
    (b2) processing a reaction of said first phosphoric acid solution and said iron powder at a second temperature, lowering the reaction temperature to a third temperature after said second temperature is reached by the reaction temperature, and maintaining the reaction temperature for a first time period; and
    (b3) lowering the reaction temperature to a fourth temperature and adding a second phosphoric acid solution consisting a second quantity of said phosphoric acid, and processing a reaction of said first phosphoric acid solution, said second phosphoric acid solution and said iron powder for a second time period in order to produce said first product.

6. The preparation method according to claim 5, wherein the weight ratio of said first quantity to said second quantity is 3:1.

7. The preparation method according to claim 5, wherein said first temperature is equal to or larger than 40° C. and equal to or less than 50° C., said second temperature is equal to or less than 60° C., said third temperature is equal to or less than 50° C., and said fourth temperature is equal to or less than 30° C.

8. The preparation method according to claim 5, wherein said first time period is at least 3 hours and said second time period is at least 23 hours.

9. The preparation method according to claim 1, wherein said carbon source is a carbohydrate, an organic compound, a polymer or a macromolecule material, and wherein said step (c) further comprises steps of:
    (c1) grinding said first product at a first rotational speed;
    (c2) adding said macromolecule material after said first product is grinded for a third time period, processing a reaction of said macromolecule material and said first product to produce a precursor solution, and continuously performing the grinding; and
    (c3) performing a spray drying action and a thermal treatment to said precursor solution in order to obtain said precursor when the average diameter of particles of said precursor solution is grinded so as to be less than a first length.

10. The preparation method according to claim 9, wherein an entrance temperature of said spray drying action is 210° C., an exit temperature of said spray drying action is −95° C., and the rotational speed of said spray drying action is 350 Hz.

11. The preparation method according to claim 9, wherein said thermal treatment is sequentially performed at 280° C. for 2 hours and at 350° C. for 1 hour in helium atmosphere.

12. The preparation method according to claim 9, wherein said first rotational speed is equal to or greater than 450 rpm and equal to or less than 650 rpm.

13. The preparation method according to claim 9, wherein said third time period is at least 5 minutes.

14. The preparation method according to claim 9, wherein said first length is 1 micrometer.

15. The preparation method according to claim 1, wherein said step (d) further comprises steps of:
    (d1) mixing said precursor and said first reactant;
    (d2) adding a dispersant and performing a spray granulation;
    (d3) performing a high-temperature calcination; and
    (d4) producing said battery composite material.

16. A preparation method of a battery composite material, comprising steps of:
    (a) providing phosphoric acid, iron powder, a carbon source and a first reactant, wherein the formula of said phosphoric acid is written by $H_3PO_4$, and the formula of said iron powder is written by Fe;
    (b) allowing deionized water to dissolve a first quantity of said phosphoric acid for forming a first phosphoric acid solution;
    (c) processing a reaction of said first phosphoric acid solution and said iron powder;
    (d) adding a second phosphoric acid solution consisting a second quantity of said phosphoric acid, and processing a reaction of said first phosphoric acid solution, said second phosphoric acid solution and said iron powder in order to produce a precursor solution, wherein the weight ratio of said first quantity to said second quantity is 3:1;
    (e) performing a spray drying action and a thermal treatment to said precursor solution in order to obtain a precursor, wherein the formula of said precursor is written by $Fe_7(PO_4)_6$; and
    (f) processing a reaction of said precursor and said first reactant to produce said battery composite material.

17. A preparation method of a precursor of a battery composite material, comprising steps of:
    processing a reaction of iron powder and a compound releasing phosphate ions in a solution to produce a first product; and performing a thermal treatment to said first product for producing a precursor, wherein the formula of the precursor is written by $Fe_7(PO_4)_6$.

18. A preparation method of a battery composite material, comprising steps of processing a reaction of a precursor and a first reactant and calcining a reaction mixture to produce said battery composite material, wherein the formula of said precursor is written by $Fe_7(PO_4)_6$, and the formula of said battery composite material is written by $LiFePO_4$.

* * * * *